United States Patent [19]

Singh

[11] 4,099,342
[45] Jul. 11, 1978

[54] FOOTWEAR

[75] Inventor: Tej Kuldip Singh, Baildon, England

[73] Assignee: Associated Paper Industries Limited, London, England

[21] Appl. No.: 817,072

[22] Filed: Jul. 19, 1977

[30] Foreign Application Priority Data

Jul. 31, 1976 [GB] United Kingdom ............... 32010/76

[51] Int. Cl.$^2$ ...................... A43B 13/38; A43B 23/00; B32B 5/16
[52] U.S. Cl. ........................................ 36/44; 428/198; 428/201; 428/237; 428/244; 428/310; 428/317
[58] Field of Search ...................... 36/43, 44; 428/198, 428/201, 206, 236, 237, 244, 281, 310, 317

[56] References Cited

U.S. PATENT DOCUMENTS 3,842,519 10/1974 Lapidus .................................. 36/44
3,852,897 12/1974 Bridge ..................................... 36/44

FOREIGN PATENT DOCUMENTS 1,253,028 11/1971 United Kingdom ..................... 36/44
1,270,809 4/1972 United Kingdom ..................... 36/44

Primary Examiner—William J. Van Balen
Attorney, Agent, or Firm—Beveridge, DeGrandi, Kline & Lunsford

[57] ABSTRACT

This invention relates to air-permeable insoles comprising a web or matt of fibres loaded with active carbon and held together by a binder disposed predominently at or near the surfaces of the web or matt, and at least one surface of said web or matt having a wear-resistant fabric bonded thereto by means of a discontinuous layer of binder extending from the surface of each of the wear-resistant fabrics into the surface of the web or matt.

5 Claims, 3 Drawing Figures

FOOTWEAR

The present invention relates to insocks for footwear and in particular to such insock which reduces odours which sometimes occur due to feet perspiring.

The provision of an insole which will effectively reduce or remove odours caused by perspiring feet, which has a reasonable active life and which will stand up to normal wear and tear was for many years a problem which remained unsolved.

Insoles composed of felt impregnated with various medicaments for the supression of putrification of perspiration excreted from the feet of the wearer have been proposed. In one case the felt was impregnated with a liquid containing the medicament and in another pockets were provided in the surface of the felt which pockets contained various medicaments or deodorants. None of these has however been successful in practice either due to the ineffectiveness of the medicament or to the short active life thereof or both. Furthermore the repeated and prolonged use of certain chemicals (e.g. deodorants) can give rise to allergic effects either to the chemical or its carrier agent.

It has also been proposed to use active carbon granules disposed between two or more sheets of fabrics. Such insoles however do not stand up to normal wear and tear if the granules are not fixed by means of some form of adhesive, but when adhesives were used it was found that the activity of the carbon was lost due to poisoning of the carbon by the adhesive or to a lowering of the permeability of the insole below the level at which the active carbon could effectively act.

The obvious expedient seemed to be the production of a web or matt containing active carbon and effecting impregnation of the matt with a binder only at the surfaces of the matt or web so as to avoid contamination of the carbon. This however was found ineffective since the resistance to wear and tear was found to be very low.

The problem was finally solved for the majority of sufferers when it was found that when such a fibrous matt or web containing active carbon was impregnated throughout its thickness with a latex binder and then migration of the binder from its interior to the surfaces of the web was effected contrary to exception the activity of the active carbon remained at an effective level and the strength of the insole was sufficient to withstand ordinary wear and tear. Such insoles are described and claimed in U.S. Pat. No. 3,852,897, issued 10th Dec. 1974.

It has now been found however that whilst the insoles of U.S. Pat. No. 3,852,897 are satisfactory for the majority of sufferers from perspiring feet, many cases do exist in which the level of excretion of perspiration is so great that the wearing properties of even the insoles of said U.S. patent are not sufficient and break down of the insole can occur in a few days, or in some extreme cases even in a few hours.

Attempts to increase the wear resistance of such insoles by using wear resistance fabrics as woven nylon, terylene, viscose etc. as the top surface of the insoles of the said U.S. Patent were not successful since the amount of latex required at the surface to adequately bond such fabrics was too great to be achieved by the migration process of that patent. The use of additional latex on the surface after formation of the web was also unsuccessful since the permeability of the web was then lowered to a point where it failed to achieve its object in use.

Methods for attaching synthetic wear resistance fabrics which required heat and pressure were also felt to be inadvisable as such methods would be expected to impair the permeability of the web. Surprisingly however, it has been found that an effective bonding of such fabrics to the surface of the insoles of the said U.S. patent to Bridge and Singh can be achieved by the use of a discontinuous layer of binder, e.g. a printed pattern of adhesive or by using a perforated thermoplastic sheet of lower melting point than the fabric to be bonded.

It has surprisingly been found that notwithstanding the heat and pressure required by such methods, the permeability of the web remains at a usable level and the adhesive penetrates only into the part of the insole near the surface so that the activity of the majority of the carbon remains unaffected.

The invention therefore provides an air permeable insole comprising a web or matt of fibres loaded with active carbon and held together by a binder disposed predominantly at or near the surfaces of the web or matt and at least one surface of said web or matt having a wear-resistant fabric bonded thereto by means of a discontinuous layer of binder extending from the surface of the wear-resistant fabric into the surface of the web or matt. The layer of binder may be formed for example by applying a printed pattern of adhesive to the surface or surfaces of the web or matt which is or are to receive a wear-resistant fabric or the layer of binder may be a reticular sheet (e.g. a perforated thermoplastic sheet or a woven or knitted fabric) of thermoplastic material having a lower melting point than the wear-resistant fabric, which patterned sheet or sheets is or are then cured by heat and pressure whereby to bond a wear-resistant fabric to one or both surfaces of the web or matt whilst retaining the desired air permeability in the final product.

One method of producing what is in effect a discontinuous layer of binder is to use a layer of preformed open cell foam between the insole and the synthetic wear resistant fabric, the foam being coated on both surfaces with binder, the amount of binder applied sufficient only to coat the surface area thereof surrounding the surface pores. In this way the permeability of the foam layer remains substantially unaffected and the coating of binder takes the form of a discontinuous layer thus retaining the desired permeability in the final product. Furthermore it has surprisingly been found that materials such as lightweight cotton cloth not normally regarded as wear-resistant have their effective wearlife substantially increased - to the point where they are commercially viable when such foam layers are used.

In a further embodiment the invention provides an air permeable insole comprising a web or matt of fibres loaded with active carbon and held together by a binder dispoed predominantly at or near the surfaces of the web or matt, a layer of preformed open-cell foam one surface of which is bonded to one surface of said web or matt by means of a discontinuous layer of binder extending from the surface area of the foam excluding the surface pores into the surface of the web or matt and a wear-resistant fabric bonded to the remaining surface of said foam by means of a discontinuous layer of binder which extends only over the surface area surrounding the surface pores of said remaining surface.

For a discontinuous applied pattern the binder may be the same as that used to bind the web or matt except that the water content should be lower e.g. of the order of 50% as opposed to the usual 85% used for binding of the web or matt. Any other suitable adhesive having the requisite properties e.g. moisture resistance odourlessness etc. may also be used. When a foam layer is used any of the solvent-based binders normally used for binding foam layers onto surfaces may also be used in place of the water-based binders.

When only one surface has a wear-resistant fabric bonded thereto, in order to overcome the problem of the active carbon/fibre layer sticking to the insole of the shoe thus causing premature break down, the following alternatives can be used.

1. A preformed polythene foam may be laminated to the bottom surface using a polyurethane adhesive.
2. A foamed latex may be deposited on the bottom surface (bottom side up), set and heat cured.

When foam is not required the bottom surface can be protected by the conventional lamination to it of cloth, non-woven fabric or latex impregnated board or paper. Any loss of permeability in this direction i.e. downwardly when the insole is in place in the shoe is not important.

In the accompanying drawings.

In the drawings the same numerals are used to indicate similar or identical components.

EXAMPLE I

A mixture of equal parts woodpulp and active carbon was fed into the apparatus and processed by the method described in British Pat. No. 1,283,721 (or corresponding foreign patents) and the resulting web deposited on a cotton scrim. (Basis weight 43 g/m2). The web supported by the cotton scrim at the bottom had a perforated polythene net (Basis weight 45g/m2) applied to the top layer just before entry to the impregnator where it was impregnated with a mixture of 10% acrylic latex dry solids basis and 4% melamin formaldehyde syrup. The impregnated web was passed through an infra red drying tunnel and then over conventional paper making cylinders.

The dried material was then passed through a transfer printing machine at 170° C with a layer of knitted nylon in contact with the perforated polythene net (Basis weight 45 g/m2). The polythene net on melting resulted in the nylon bonding to the fibre/carbon layer.

Figure 1:
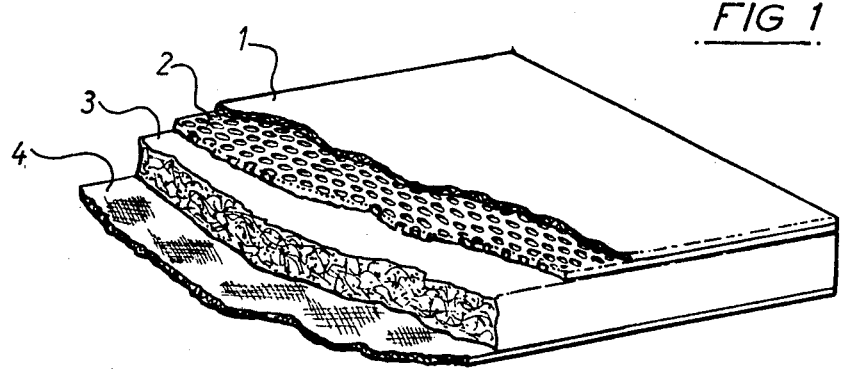
FIG. 1 illustrates in part cut-away section the embodiment as hereinafter described in Example 1.

The final composite material shown in FIG. 1 had the following properties:

| | |
|---|---|
| Basis weight | 660 g/m2 |
| Caliper | 1.93mm |
| Active carbon Content | 33% (220 g/m2) |
| Binder content | 15.5% |

The material was cut into the shape of insocks and placed in shoes with the nylon uppermost. The insocks had much better wearing properties and appearance than the insocks described in U.S. Pat. No. 3,852,897.

Referring to FIG. 1 the composite material of Example I consists of a nylon layer 1 bonded to one side of a carbon/fibre/binder layer 3 by means of a melted perforated polythene net 2. On the other side of the carbon/fibre/binder layer 3 is a cotton cloth layer 4.

EXAMPLE II

This was carried out in the same manner as in example I except that the web was deposited on a perforated polythene net (Basis weight 45 g/m2) instead of the cotton scrim. A further similar perforated polythene net was applied to the top surface. The dried material was laminated with nylon on both surfaces using two passes through the transfer printing machine resulting in a composite material shown in FIG. 2.

The material had the following properties:

| | |
|---|---|
| Basis weight | 730 g/m2 |
| Caliper | 2.05mm |
| Active Carbon Content | 30% (220 g/m2) |
| Binder Content | 14.4% |

The material had a similar performance to the material of example I but had the further advantage of a better appearance and not requiring left and right shapes for a pair as either surface could be used for the top.

Figure 2:
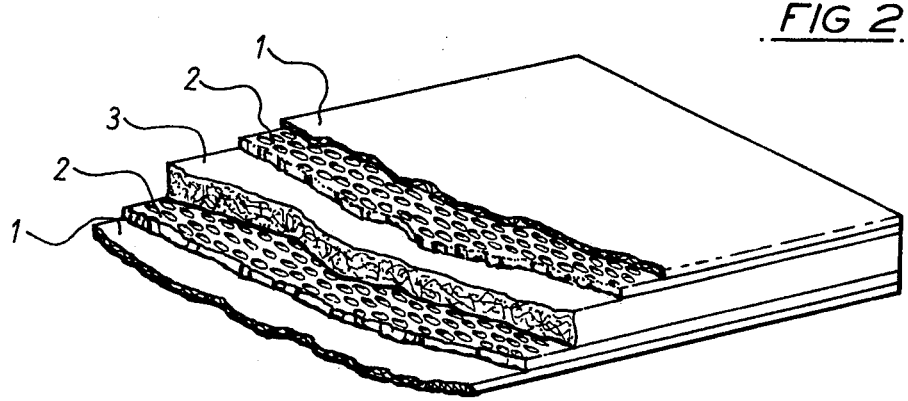
FIG. 2 illustrates in part cut-away section the embodiment as hereinafter described in Example 2.

Referring to FIG. 2, the composite material of Example II consists of a carbon/fibre/binder layer 3 having nylon layers 1a, b bonded to both sides thereof by means of melted perforated polythene nets 2a, b.

EXAMPLE III

A mixture of equal parts woodpulp and active carbon was fed into the apparatus and processed by the method described in British Pat. No. 1,283,721 (or corresponding foreign patents) and the resulting web deposited on a cotton scrim. (Basis weight 43 g/m2). The web supported by the cotton scrim at the bottom had a perforated polythene net (Basis weight 45 g/m2) applied to the top layer just before entry to the impregnator where it was impregnated with a mixture of 10% acrylic latex dry solids basis and 4% melamin formaldehyde syrup. The impregnated web was passed through an infra red drying tunnel and then over conventional paper making cylinders.

The dried material then laminated with a knitted nylon fabric (basis weight 40g/m2) by interposing a layer of preformed polyurethane open cell foam (1mm thick, 40g/m2) both surfaces of which had been coated with sufficient latex binder sufficient only to coat the surface of the foam surrounding the pores thereof and curing the laminate under heat and pressure in conventional equipment.

The final composite material shown in FIG. 2 had the following properties:

| | |
|---|---|
| Basis weight | 600 g/m2 |
| Caliper | 2.00mm |
| Active Carbon content | 33% (200 g/m2) |
| Binder Content | 17.33% |

The material was cut into the shape of insocks and placed in shoes with the nylon uppermost. The insocks had much better wearing properties and appearance than the insocks described in U.S. Pat. No. 3,852,897.

Figure 3:
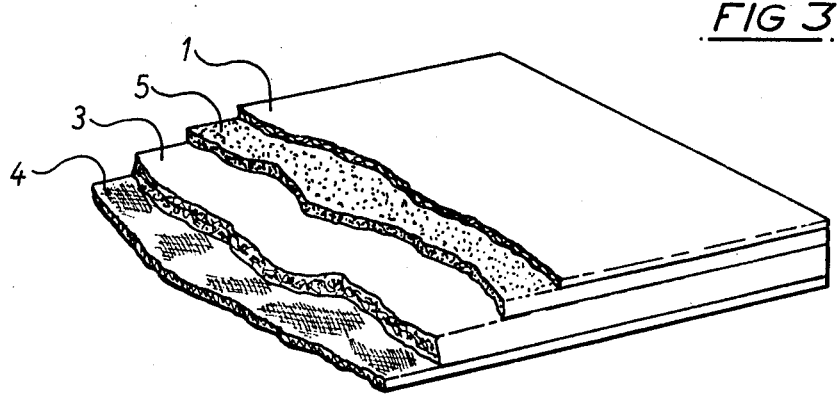
FIG. 3 illustrates in part cut-away section the embodiment as hereinafter described in Example 3.

Referring to FIG. 3, the composite material of Example III consists of a carbon/fibre/binder layer 3 having a cotton cloth layer 4 on side thereof and a layer of polyurethane open cell foam layer 5 bonded to the other side, a nylon layer being bonded to the other side of the foam layer 5.

I claim:

1. An air-permeable insole comprising a web or matt of fibres loaded with active carbon and held together by a binder disposed predominently at or near the surfaces of the web or matt, and at least one surface of said web or matt having a wear-resistant fabric bonded thereto by means of a discontinuous layer of binder extending from the surface of each of the wear-resistant fabrics into the surface of the web or matt.

2. An air-permeable insole as claimed in claim 1, in which the discontinous layer of binder is formed from a melted reticular thermoplastic material having a lower melting point than the wear-resistant fabric.

3. An air-permeable insole as claimed in claim 2, in which the reticular material is a perforated sheet of thermoplastic material or is a woven or knitted fabric formed from thermoplastic filaments or yarns.

4. An air-permeable insole comprising a web or matt of fibres loaded with active carbon and held together by a binder disposed predominently at or near the surfaces of the web or matt, a layer of preformed open cell foam one surface of which is bonded to one surface of said web or matt by means of a discontinuous layer of binder extending from the surface area of the foam excluding the surface pores into the surface of the web or matt and a wear-resistant fabric bonded to the remaining surface of the foam by means of a discontinuous layer of binder which extends only over the surface area surrounding the surface pores of said remaining surface.

5. An air-permeable insole as claimed in claim 4, in which the wear-resistant fabric is replaced by a lightweight cotton cloth.

* * * * *